United States Patent Office 3,393,872
Patented July 23, 1968

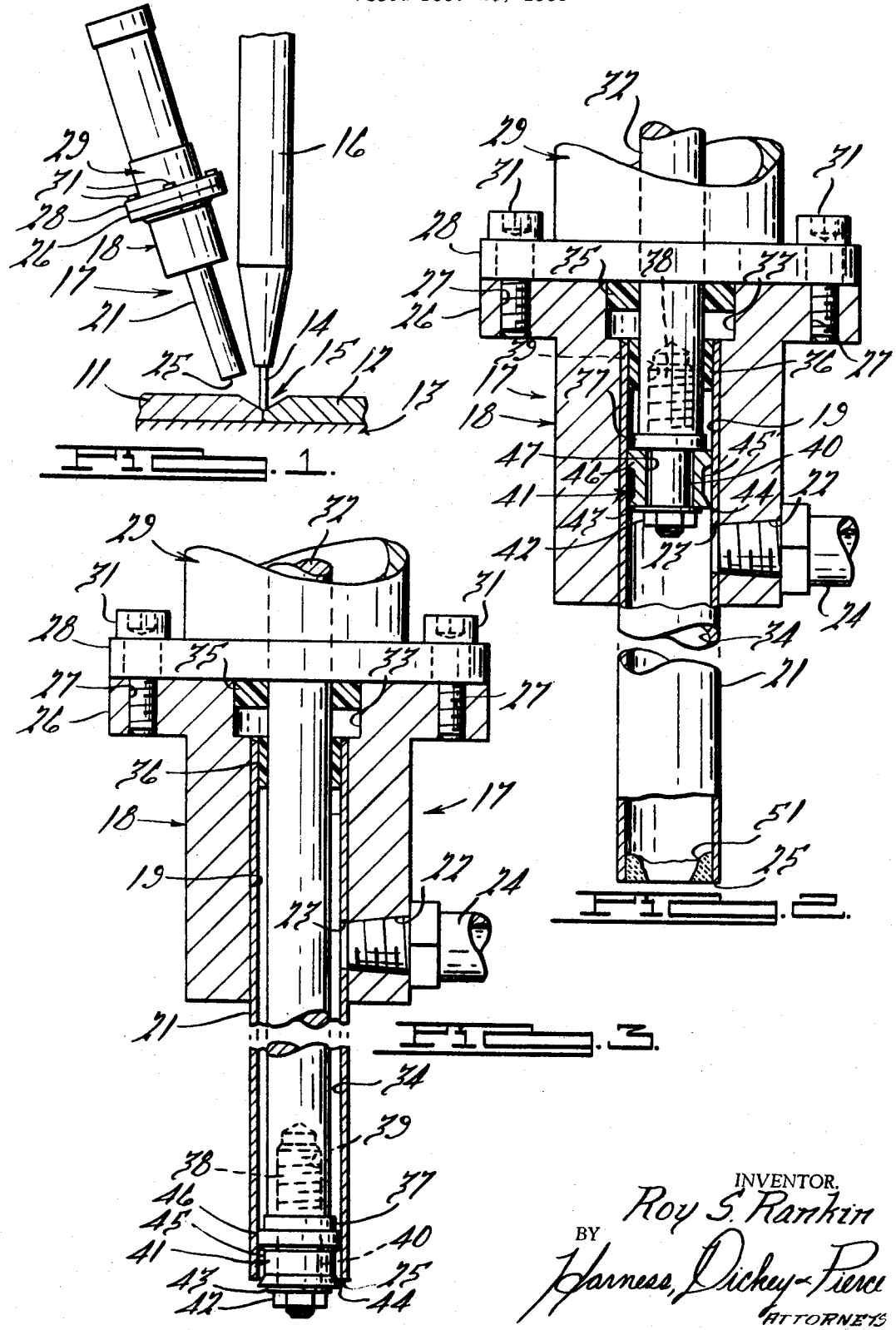

3,393,872
RECIPROCATING NOZZLE CLEANER
Roy S. Rankin, 3060 Berkshire Drive,
Birmingham, Mich. 48010
Filed Dec. 28, 1966, Ser. No. 605,369
8 Claims. (Cl. 239—117)

This invention relates to a nozzle cleaning device and more particularly to a device for cleaning the nozzles of welding apparatus.

Frequently, the discharge end of the nozzle is positioned in such a manner that it is prone to the accumulation of foreign matter. As the foreign matter builds up, the flow area of the nozzle is restricted or in extreme cases may be completely shut off. This problem is particularly acute in certain welding techniques wherein an inert atmosphere is generated around the weld area by the discharge of an inert gas through a nozzle. The weld splatter accumulates on the discharge end of the nozzle disrupting the flow through it.

Different types of automatic nozzle cleaning apparatus have been proposed for periodically cleaning the discharge ends of such nozzles. One such nozzle cleaning device is shown in my copending patent application of the same title, Ser. No. 605,370, filed Dec. 28, 1966. The nozzle cleaning device shown in that application is comprised of two relatively movable parts that define the gas flow passage and accomplish the cleaning without any significant change in flow area. This permits the cleaning to be accomplished without interrupting the gas flow.

In some instances, it may be desirable to provide a separate nozzle cleaning element that is mounted internally of the gas flow passage and reciprocates within the flow passage to accomplish the cleaning. One problem with this later type of nozzle cleaning device is that the axis of reciprocation of the nozzle cleaning element may not coincide with the axis of the gas flow passage. This misalignment can cause the cleaning element to bind and become inoperative or to damage the flow nozzle.

It is, therefore, a principal object of this invention to provide an improved, automatic nozzle cleaning device.

It is another object of this invention to provide an improved nozzle cleaning device for a welding apparatus.

It is a further object of this invention to provide a nozzle cleaning device wherein the cleaning element is supported for reciprocation within the flow passage and wherein the cleaning element can center itself within the flow passage.

A cleaning device embodying this invention is particularly adapted to clean a nozzle member that defines an open ended gas flow passage extending along a longitudinal axis. A drive member is supported for reciprocation along a longitudinal axis within the gas flow passage and has a stroke in excess of a distance between the open end and a point at which a gas supply is delivered to the passage. A cleaning element is positioned within the flow passage and has a cutting edge conforming substantially to the cross-sectional shape of the gas flow passage at at least its open end. Means support the cleaning element at one end of the drive member for simultaneous axial movement with the drive element. The supporting means, however, permits movement of the cleaning element transversely to the drive member for compensation in any misalignment that may occur between the axes of the drive member and the flow passage. The cleaning element has its cutting edge extending beyond the open end of the passage when the drive member is in one of its extreme axial positions for cleaning this end. The cleaning element has its cutting edge disposed within the gas flow passage and spaced from the point of gas supply when the drive member is in its other extreme axial positions so as to not interfere with the gas passage from the point of introduction to the open end. An operating element is provided to reciprocate the drive member and accomplish the periodic cleaning of the nozzle discharge end.

Other objects and advantages of this invention will become more apparent as this description proceeds, particularly when considered in conjunction with the accompanying drawings, wherein:

FIGURE 1 is a side elevational view, with portions shown in section, of a welding apparatus embodying this invention.

FIGURE 2 is an enlarged view of the gas supply and nozzle cleaning device shown in FIGURE 1, with portions shown in section.

FIGURE 3 is an enlarged view with portions shown in section, in part similar to FIGURE 2, showing the cleaning device at the end of its cleaning stroke.

Referring now in detail to the drawings and in particular to FIGURE 1, an apparatus is illustrated for welding a pair of pieces of material 11 and 12 together. The pieces 11 and 12 are supported upon a work table 13 and a welding electrode 14 is fed into the weld area, indicated generally by the reference numeral 15 by an electrode holder 16. A gas delivery apparatus 17, which incorporates the nozzle cleaning device embodying this invention is supported adjacent the electrode holder 16 in any known manner for generating an inert atmosphere around the weld area 15.

Referring now to the remaining figures, the gas delivery apparatus 17 includes a generally cylindrical supporting element 18 that is formed with an axially extending bore 19 into which a tubular piece 21 of copper or some other metal having a high coefficient of thermal conductivity is inserted and held by a press fit. The supporting element 18 is formed with a tapped opening 22 that terminates adjacent a complementary bore 23 formed in the copper tube 21. A suitable gas supply conduit 24 is threaded into the tapped opening 22 so as to supply any known inert gas, for example, carbon dioxide, to the weld area through the passage of the tube 21 and at its open end 25 which is positioned adjacent the weld area 15.

The upper end of the supporting element 18 is formed with an integral, cylindrical flange 26 in which a plurality of circumferentially spaced, tapped holes 27 are formed. A corresponding flange 28 of an actuating cylinder assembly 29 is affixed to the flange 26 by means of socket headed bolts 31 that are threaded into the tapped holes 27.

The actuating cylinder 29 may be hydraulic pneumatic, or may be operated by means of an electric solenoid and includes a reciprocating driving member in the form of a piston rod 32 that extends through an enlarged bore 33 formed in the supporting element flange portion 26 and into a gas flow passage 34 formed by the copper tube 21. A pair of nylon or other anti-friction bushings 35 and 36 supported in the bores 33 and 34, respectively guide the piston rod 32.

The lower end of the piston rod 32 terminates at a large diameter shoulder 37. A stud 38 is threaded into a tapped hole 39 formed in the lower end of the piston rod 32 which stud has a generally smooth cylindrical portion 40 adjacent its outer end. A cleaning element, indicated generally by the reference numeral 41 is received upon the stud portion 40 and held in place thereupon by a lock nut 42 that is threaded onto a screw threaded end of the stud 38 and by a washer 43. The cleaning element 41 is formed from tungsten carbide or any other suitable, relatively hard material and has a sharp cutting edge 44 formed at its outer end. The cleaning element cutting edge 44 tapers inwardly toward a reduced diameter spool portion 45. A circumferentially extending rib 46 is formed at the end opposite the cutting edge 44 or, alternatively, a number of circumferentially spaced raised portions may be provided in this area for a reason which will become more apparent as this description proceeds.

The cutting element 41 is formed with an enlarged bore 47 that extends around the stud portion 40 so that the cleaning element 41 may move transversely with respect to the piston rod 32 although it is affixed for axial movement with the piston rod 32.

OPERATION

FIGURE 2 shows the cleaning element in its retracted position above the point of discharge of the gas delivery conduit 24 into the copper tube 21 when the piston rod 32 is at one extreme of the stroke. The piston rod 32 has a stroke that is greater in length than the distance between the opening 23 and the open tube end 25 so that when the piston rod 32 is actuated to its other extreme position (FIGURE 3), the cutting edge 44 of the cleaning element 41 will extend beyond the open tube end 25. During welding, weld splatter 51 (shown in an exaggerated condition in FIGURE 2) may accumulate in the open end of the tube 21 adjacent the weld area 15 due to the proximity of the gas discharge to the point at which the weld is being made. The fact that the tube 21 is made from copper or another metal having high thermal conductivity reduces, to some extent, the amount of accumulated weld splatter since heat is rapidly transmitted from this area. This heat transmission reduces the tendency for the splatter to be welded to the end of the tube 21. In the event, some weld splatter may nevertheless accumulate.

To clean the weld splatter, the actuating cylinder assembly 29 is activated to drive the piston rod 32 to its other extreme axial position (FIGURE 3). The cutting edge 44 then scrapes the inner diameter of the tube 29 and forces the weld splatter from the open tube end 25. During this axial movement, the cleaning element 41 may shift transversely with respect to the piston rod 32 due to its loose fit thereon so as to compensate for any misalignment between the axes of the piston rod 23 and the longitudinal axis of the gas discharge passage 34. The rib 46 will, however, preclude cocking of the cleaning element as it is moved along the tube 21. In operation, the piston rod 32 and the cleaning element 41 may be actuated at the end of each weld cycle by any known method or, alternatively, a different operating sequence may be provided, depending upon the conditions encountered.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A cleaning device for a flow nozzle or the like comprising a nozzle member defining a gas flow passage extending along a longitudinal axis and open at one end, means for delivering a gas supply to said passage at a point spaced from said open end, a drive member supported for reciprocation along a longitudinal axis within said gas flow passage between two extreme axial positions, said drive member having a stroke in excess of the distance between said open end and the point of gas supply to said passage, a cleaning element supported within said passage and having a cutting edge conforming substantially to the cross-sectional shape of said gas flow passage at least at said open end, means supporting said cleaning element at one end of said drive member for simultaneous axial movement with said drive element, said supporting means permitting movement of said cleaning element transversely to said drive member to compensate for misalignment between the axes of said drive member and said gas flow passage, said cleaning element having its cutting edge extending beyond said open end when said drive member is in one of its extreme axial positions for cleaning accumulated foreign matter from said open end, said cleaning element having its cutting edge disposed within said gas flow passage at a point spaced from the point of gas supply to said passage when said drive member is in its other extreme axial position to avoid interference with the flow of gas from said point of supply to said open end, and means for sequentially actuating said drive member between its two extreme axial positions.

2. A cleaning device as set forth in claim 1 wherein the nozzle member comprises a supporting element having a bore formed therein and a tube supported in said bore and extending away from said supporting element, said tube defining the gas flow passage.

3. A cleaning device as set forth in claim 2 wherein the tube is formed from a material having a high coefficient of thermal conductivity to reduce the tendency for foreign material to acumulate at its open end.

4. A cleaning device as set forth in claim 1 wherein the drive member is formed with a shoulder at its outer end and having a reduced diameter portion extending beyond said shoulder, said cleaning element being received upon said reduced diameter portion and abuttingly engaged with said shoulder, said cleaning element having a bore receiving said reduced diameter portion, the diameter of said bore being larger than the diameter of said reduced diameter portion.

5. A cleaning device as set forth in claim 4 wherein the cleaning element is formed with its cutting edge at one end thereof, said cleaning element further being provided with at least one raised portion at its other end adapted to engage the gas flow passage and prevent cocking of said cleaning element upon said drive member.

6. A cleaning device as set forth in claim 5 wherein the nozzle member comprises a supporting element having a bore formed therein and a tube supported in said bore and extending away from said supporting element, said tube defining the gas flow passage.

7. A cleaning device as set forth in claim 6 wherein the tube is press fitted into the supporting element.

8. A cleaning device as set forth in claim 7 wherein the reduced diameter portion of the drive member is formed by a smooth portion of a stud that is tapped into a piston rod of an actuating cylinder.

References Cited

UNITED STATES PATENTS

| | | | |
|---|---|---|---|
| 1,958,400 | 5/1934 | Tullis et al. | 239—117 |
| 2,343,034 | 2/1944 | Weber | 239—117 X |
| 3,284,608 | 11/1966 | McDonald | 15—104.16 X |

M. HENSON WOOD, JR., *Primary Examiner.*

H. NATTER, *Assistant Examiner.*